United States Patent [19]

Ramanujan et al.

[11] Patent Number: 5,202,973
[45] Date of Patent: Apr. 13, 1993

[54] METHOD OF CONTROLLING A SHARED MEMORY BUS IN A MULTIPROCESSOR SYSTEM FOR PREVENTING BUS COLLISIONS AND FOR ENSURING A FULL BUS

[75] Inventors: Raj Ramanujan, Leominster; James B. Keller, Arlington, both of Mass.; Jay Stickney, Derry, N.H.; Steven Ho, Westford; Paul J. Lemmon, West Townsend, both of Mass.

[73] Assignee: Digital Equipment Corporation, Maynard, Mass.

[21] Appl. No.: 546,548

[22] Filed: Jun. 29, 1990

[51] Int. Cl.$^5$ ............... G06F 13/00; G06F 13/376
[52] U.S. Cl. ....................... 395/425; 395/275; 395/550; 364/DIG. 1
[58] Field of Search ... 364/200 MS File, 900 MS File, 364/240.1; 395/425, 400

[56] References Cited

U.S. PATENT DOCUMENTS

| | | | |
|---|---|---|---|
| 3,805,247 | 4/1974 | Zucker et al. | 395/375 |
| 4,141,067 | 2/1979 | McLagen | 395/425 |
| 4,195,343 | 3/1980 | Joyce | 395/425 |
| 4,586,133 | 4/1986 | Steckler | 395/325 |
| 4,592,010 | 5/1986 | Wollscheid | 395/800 |
| 4,888,741 | 12/1989 | Malinowski | 365/230 |
| 4,912,631 | 3/1990 | Lloyd | 395/425 |
| 5,027,270 | 6/1991 | Riordan et al. | 395/425 |
| 5,058,051 | 10/1991 | Brooks | 395/425 |

Primary Examiner—Joseph L. Dixon
Assistant Examiner—Frank J. Asta
Attorney, Agent, or Firm—Kenyon & Kenyon

[57] ABSTRACT

A system and method for controlling a shared memory bus in a computer of a multi-processor system prevents collisions on the shared bus and ensures that the bus is full at system start-up. Steady state operations are maintained without the need for a queuing mechanism in the system's memory controller and in view of the memory modules of the shared memory having different read access times, with the system and method being implemented in a system that includes a central unit and multiple uni-directional buses that are disposed between a shared memory and a plurality of processors, with the central unit controlling access to, and use of, the shared buses of the system.

7 Claims, 11 Drawing Sheets

FIG. 11

| FC | SOURCE I.D. | DEST. I.D. | COMMAND |
|----|-------------|------------|---------|

METHOD OF CONTROLLING A SHARED MEMORY BUS IN A MULTIPROCESSOR SYSTEM FOR PREVENTING BUS COLLISIONS AND FOR ENSURING A FULL BUS

TECHNICAL FIELD

The present invention relates to computer systems that have more than one processor that share a memory. More particularly, the present invention relates to systems and methods for controlling a shared memory bus that connects to a number of processors and to a shared memory.

BACKGROUND OF THE INVENTION

In computer systems, it is common for one or more processors to access a memory, referred to as a "shared memory". Also, the shared memory may be a memory array that contains a number of memory modules. Access to the shared memory is generally over a shared memory bus. One such system is disclosed in copending application Ser. No. 07/546,547, entitled "HIGH SPEED BUS SYSTEM" filed on even date herewith.

Two separate uni-directional buses may connect a shared memory or memory array to a memory controller. One bus is for transmissions from the memory controller to the array and the second is for transmissions from the memory array to the memory controller.

The memory controller, in turn, may interface with a bus system that connects to memories of the system processors. This bus system may include a bidirectional bus or two uni-directional buses, with one for transmissions from the memory controller to the processor memories and the other for transmissions from the processor memories to the memory controller.

A characteristic of a system having a shared memory and number of processors is that one of the processors can issue a read command followed by an address, which when placed on the bus system is supplied not only to the memory controller but also to all of the other processors connected to the bus. This increases the system's processing speed by avoiding the need for the processor to separately notify each of the other processors.

After the memory controller receives the read command and address, it places this on the unidirectional bus between it and the memory array. The memory array responds by providing refill data on the other uni-directional bus between the memory controller and the memory array. The refill data is then placed on the bus system that supplies such data to all of the processors including, of course, the processor that requested it.

A consideration in the design of shared memory systems involving the request for, and receipt of, data from memory is memory latency, i.e., the period between the placing of a command on a bus and the returning of refill data from the memory on the bus. Without consideration of memory latency, this entire request and refill data scheme will not operate effectively since the system may not be able to handle the number of requests that are made resulting in collisions on the shared memory bus.

Most activities in any system, which include shared memory systems, require one or more cycles to complete. Typically, activities take more than one cycle and the required number of cycles vary depending on the dynamic conditions. Since this is the case, there is a strong possibility that simply placing commands and data on a common bus without controlling them may result in collisions on such a bus. Thus, such shared memory systems must have a means to prevent such collisions.

Another compounding factor is that in a single or multiprocessor system, there can be a plurality of successive read commands sent to memory. Each includes a command and an address. These read commands can be issued at a rate that exceeds the ability of the system to supply the refill data because of things such as memory latency.

Some shared memory systems include a number of state machines that are used to control placement of commands and addresses on the shared bus leading from the memory controller to the memory array. The number of state machines usually determine the number of commands and addresses a system is capable of handling at one time. Each of these separate commands and addresses that are being handled by a separate state machine, however, must be directed to different memory modules of the memory array.

If more than that number of commands and addresses are sent than can be handled by the state machines, they will be waiting for memory access at the memory controller. The memory controller, therefore, must have a queueing mechanism to handle them. Implementation of such a mechanism at the memory controller or dramatically increasing the number of state machines to expand system capabilities adds to system complexity and cost. Hence, it is desirable to accomplish memory accesses without the need to make these costly implementations.

Another consideration is a desire to efficiently use a shared bus. Normally unused or empty cycles occur between blocks of refill data on the shared bus. Preferably there should be no dead space or time on the bus. At a steady state operating condition, after each predetermined number of cycles of refill data are placed on the bus, a predetermined number of cycles of read commands and addresses should follow, immediately followed by another predetermined number of cycles of refill data. However, the elimination of dead space has to be done without causing collisions and without implementing a costly queuing mechanism.

Many systems also include a cache memory system which further complicates the collision problem. In such systems, each time a memory command and address are sent out, a check must be made to see if the requested information is contained in a cache memory of one of the system processors. If the data is found, that processor must be given access to the shared bus that links the processors, and links the processors to the memory controller. When this access is given, it will prevent other read commands from being sent out on that bus. Thus, systems must consider cache memory reads ("snoopy reads") in collision analysis.

A further complicating factor is that systems typically do not have just one type of memory in a memory array, but many types. These different memories have different read access times and, therefore, different memory latencies since read access time is part of memory latency. It follows that any method or scheme for memory bus control that depends upon a fixed timing schedule for placing commands and data on a shared bus will result in collisions on that bus. Hence there must be a method of memory bus control that considers the read access time in placing commands and addresses, and refill data on a shared memory bus.

There is a need for a memory bus control system that will overcome these problems.

SUMMARY OF THE INVENTION

The present invention is a system and method for controlling a shared memory bus in multi-processor systems. The control of the shared memory bus according to the system and method of the present invention is based on dead reckoning. That is, it relies on the known memory latency for a specific memory module in the memory array. Using known memory latency and the time required for refill data, steady state operations may be performed with successive commands and addresses being placed on the bus and provided to the memory controller at a rate which does not exceed the ability of the memory controller to handle such commands and addresses.

The system and method of the present invention also ensures that during system start-up, the commands and addresses are sent out fast enough so that there are no dead spaces, while at the same time ensuring that the "snoopy read" operations are permitted. This is accomplished by sending out three successive commands with each separated from the other by an amount of time at least equal to the "snoopy read" time. If there is a "snoopy hit," the data is read from the processor memory holding the information and the next command and address are not sent out until after the snoopy read operation is completed.

According to the present invention, memory control also is carried out in such a way that different read access times are taken into account. To do this, the read access times are stored for each memory module in the memory array and a shadow counter having a count down value based on the read access time of the module being addressed is used. The output of the shadow counter indicates when the next read memory command and address may be placed on the shared bus.

BRIEF DESCRIPTION OF THE DRAWINGS

FIG. 11 shows a command format according to the present invention.

DETAILED DESCRIPTION

The present invention is a system and method for controlling a shared memory bus such that collisions on a shared bus are prevented and the bus is filled at system start-up and during steady state operations. The present invention may be used in a bus system such as that described in copending application Ser. No. 07/546,547, entitled HIGH SPEED BUS SYSTEM.

Figure 1:
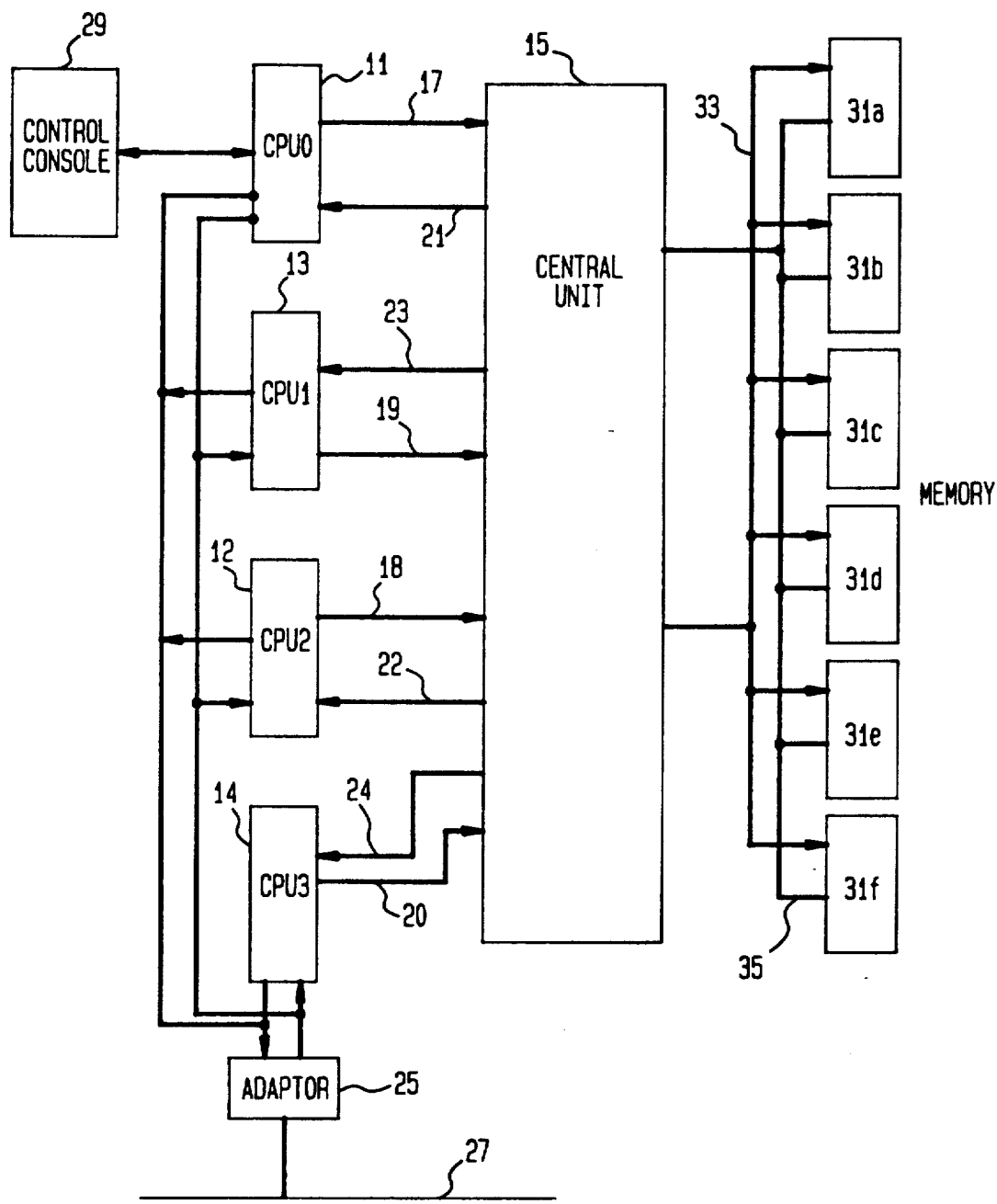
FIG. 1 is a general block diagram of a system in which the system and method of the present invention may be implemented.

FIG. 1 is a general block diagram of a system in which the system and method of the present invention may be implemented. This system has CPU 0 at 11, CPU 1 at 13, CPU 2 at 12, and CPU 3 at 14. These CPUs are coupled to central unit 15. Central unit 15 will be described in detail subsequently.

Each of the CPUs is connected to the central unit 15 over a point to point bus. Accordingly, E-BUS 0 TA bus 17 (i.e., the E-BUS associated with CPU 0 which carries signals to an A-BUS associated with a shared memory 31) connects CPU 0 at 11 to central unit 15, E-BUS 1 TA bus 19 connects CPU 1 at 13 to central unit 15, E-BUS 2 TA bus 18 connects CPU 2 at 12 to central unit 15, and E-BUS 3 TA bus 20 connects CPU 3 at 14 to central unit 15 (collectively, "E-BUS TA buses"). These unidirectional buses are for transmissions from the CPUs to central unit 15. For the transmission of data from central unit 15 to the CPUs, there are E-BUS 0 FA bus 21 (i.e., the E-BUS associated with CPU 0 which carries signals from a A-BUS associated with the shared memory 31), which connects CPU 0 at 11 to the central unit, E-BUS 1 FA bus 23, which connects CPU 1 at 13 to the central unit, E-BUS 2 FA bus 22, which connects CPU 2 at 12 to the central unit, and E-BUS 3 FA bus 24, which connects CPU 3 at 14 to central unit.

Each of the CPUs also connect to an I/O bus adaptor 25 over two uni-directional buses. Each is a 16-bit bus. One bus is an input bus and the other is an output bus.

As shown in FIG. 1, control console 29 is associated with CPU 0 at 11. However, it is understood that it may be associated with more than one CPU.

Central unit 15 is connected to shared memory 31 by uni-directional A-BUS FA 33 and uni-directional bus A-BUS TA 35. A-BUS FA 33 is for transmissions from the central unit to the shared memory 31. Conversely, A-BUS TA 35 is for transmissions from shared memory 31 to the central unit.

Shared memory 31 includes memory modules which are designated 31a, 31b, 31c, 31d, 31e, and 31f. Each memory module connects to central unit 15 via A-BUS FA at 33 and A-BUS TA at 35. It is to be understood that there may be more shared memory, or there may be more or less memory modules for a single shared memory and still be within the scope of the invention. It is further understood that each module may be of the same type of memory or each may be of a different type.

E-BUS TA buses 17, 19, 18, and 20, E-BUS FA buses 21, 23, 22, and 24, and A-BUS FA bus 33 are 32-bit parallel buses, and A-BUS TA bus 35 is a 64-bit parallel bus.

The central unit 15 performs two basic functions. First, it combines the signals input to it from the CPU and memory on the E-BUS TA and A-BUS TA buses, respectively, so that they are provided as outputs on the output buses E-BUS FA and A-BUS FA. Second, it contains a memory controller for memory modules 31a-f. Central unit 15 also controls system timing. This is done through a central clock which is not shown.

Figure 2:
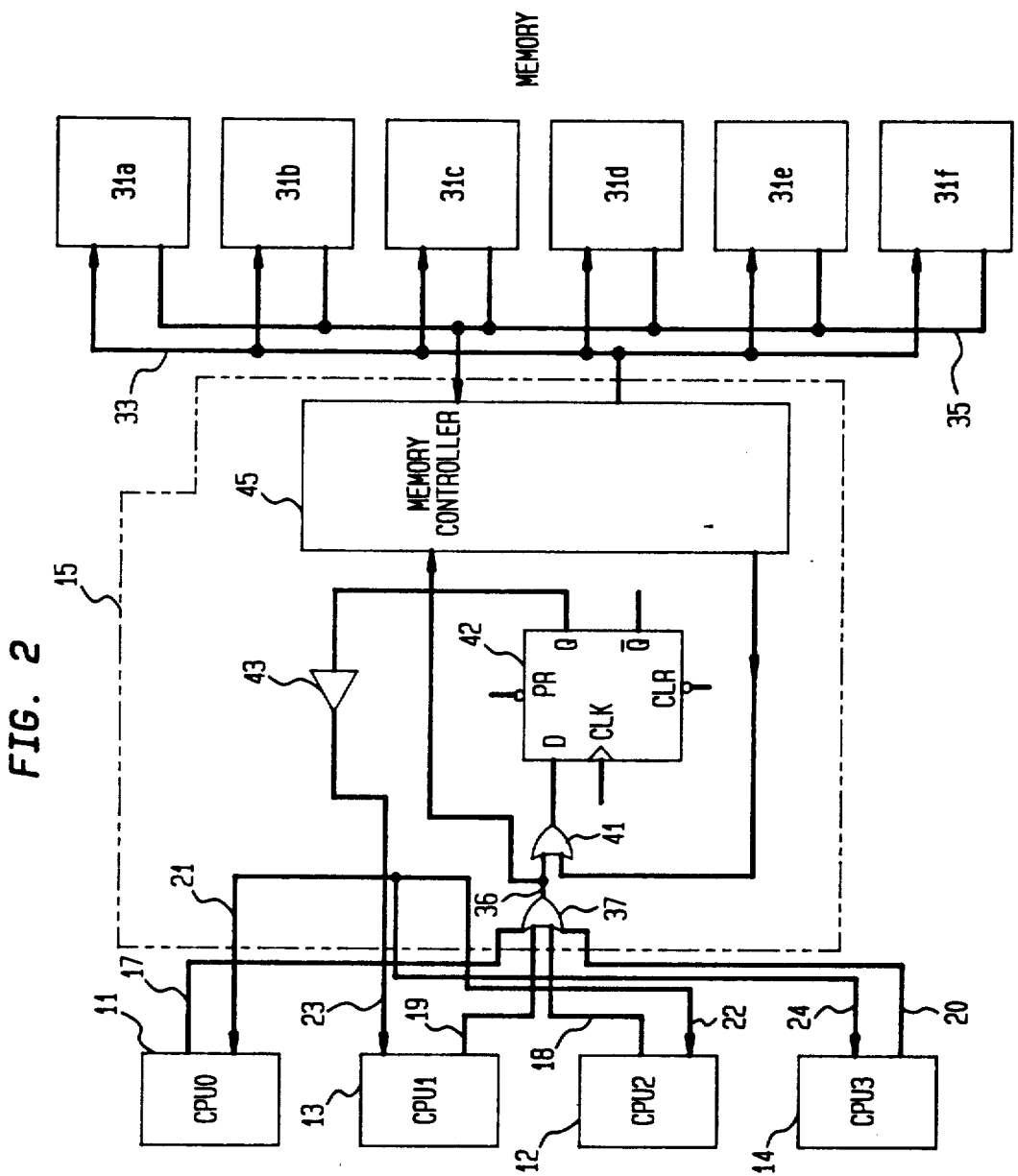
FIG. 2 is a simplified block diagram of a first implementation of the present invention using OR gates in the system shown in FIG. 1.

FIG. 2 is a block diagram of the system shown in FIG. 1, with the first implementation of the present invention in the system shown in FIG. 1. In this implementation, OR gates are used to combine the point to point signals from E-BUS TA buses 17, 19, 18, and 20 into a common signal.

As shown in FIG. 2, the 32-bit wide E-BUS TA buses 17, 19, 18, and 20 connect to the series of OR gates 37 and 41. For simplicity of description only single lines as shown for the 32-bit wide buses and only one series of OR gates are shown for handling these buses. It is understood, however, that in actuality there would be 32 series of OR gates 37 and 41 to accommodate the 32-bits of the buses. It is further understood that the single 32-bit wide output of OR gate 37 is input to memory controller 45 and OR gate 41, and the single 32-bit wide output of OR gate 41 is input to state device 42. With this understanding FIG. 2 will now be discussed.

According to this first implementation, E-BUS 0 TA 17 from CPU 0 at 11 connects to a first input to OR gate 37, E-BUS 1 TA bus 19 from CPU 1 at 13 connects to the second input to gate 37, E-BUS 2 TA bus 18 from CPU 2 at 12 connects to the third input of OR gate 37, and E-BUS 3 TA bus 20 from CPU 3 at 14 connects to the fourth input to OR gate 37. The output of OR gate 37 is bus 36 which is the first input to OR gate 41. Bus 36 is also input to memory controller 45. The second input to OR gate 41 is the output from memory controller 45. The output of OR gate 41 on bus 39 is input to the data input of state device 42. When state device 42 receives the input from OR gate 41, it stores the output for one cycle before providing it at its output.

Although not shown, conventional arbitration logic and communication between the CPUs exist. This arbitration logic, which can be centrally located or in one or more of the CPUs is necessary to ensure that only one of the CPUs has access to the bus 36 at a time. This logic functions on a request/request granted type of operation.

The output of state device 42, after passing through driver 43, is input to CPU 0 at 11, CPU 1 at 13, CPU 2 at 12, and CPU 3 at 14 via E-BUS 0 FA bus 21, E-BUS 1 FA bus 23, E-BUS 2 FA bus 22, and E-BUS 3 FA bus 24, respectively. It is understood that the output to the state device is a 32-bit wide output.

Notice that anything applied on the E-BUS x TA buses (where "x" represents any of the bus elements) will show up in the next bus cycle on the E-BUS×FA buses. Therefore, arbitration for the E-BUS×FA buses must be done prior to any element transmitting on the E-BUS×TA buses.

As stated, the output of OR gate 37, bus 36, is input to the memory controller 45. The second input to OR gate 41 is the output of memory controller 45. Therefore, the refill data from memory 31 that is on the A-BUS TA bus 35 passes through memory controller 45 for input to the second input of OR gate 41. This data is later caused to be input to state device 42. After processing by the state device, the refill data is supplied to the CPUs via driver 43 and the E-BUS FA buses. This is how refill data operates for a read.

When it is necessary to write data to the memory, data from OR gate 37 on line 36 is coupled through memory controller 45 onto the A-BUS FA 33. No refill data is provided because the data is written to memory.

Figure 3:
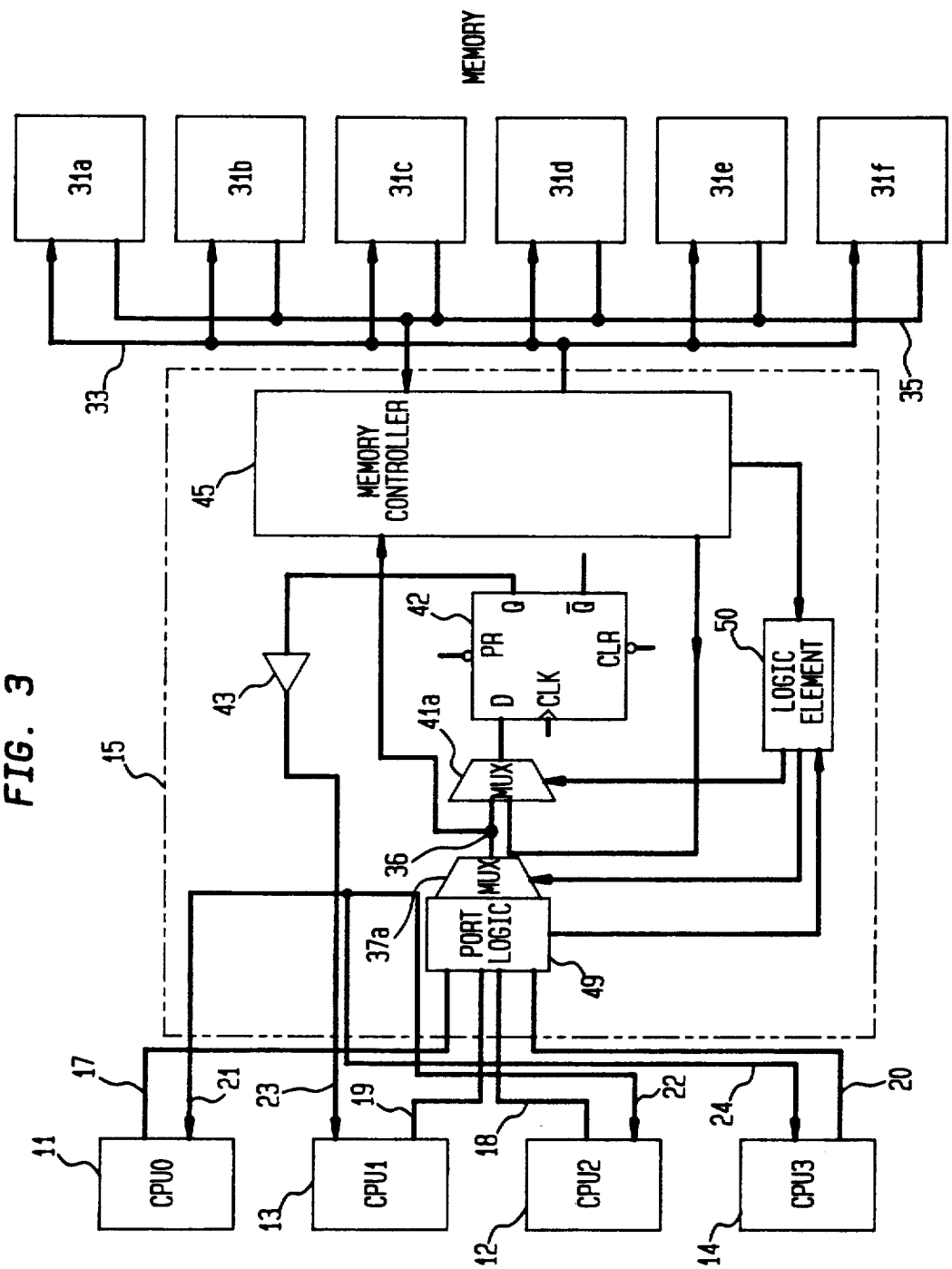
FIG. 3 a simplified block diagram of a second implementation of the present invention using multiplexers in the shown in FIG. 1.

FIG. 3 is a simplified block diagram of a second implementation of the present invention incorporated in the system shown at FIG. 1. Here, multiplexers ("MUXes") replace the series of OR gate. According to this implementation, MUXes 37a and 41a replace the OR gates. As shown in FIG. 3, logic element 50 is also added.

Port logic 49 is disposed at the input to MUX 37a. The buffer in port logic 49 can hold up to three words, the number of words being a function of the length of time for the CPUs to recognize a bus grant condition from one of the E-BUS TA buses.

Although most of the signals from the E-BUS TA buses are poised ready for input to MUX 37a, there are certain bits from port logic 49 for output to logic element 50. Logic element 50 processes these bits and provides selection inputs to MUXes 37a and 41a.

Figure 4:
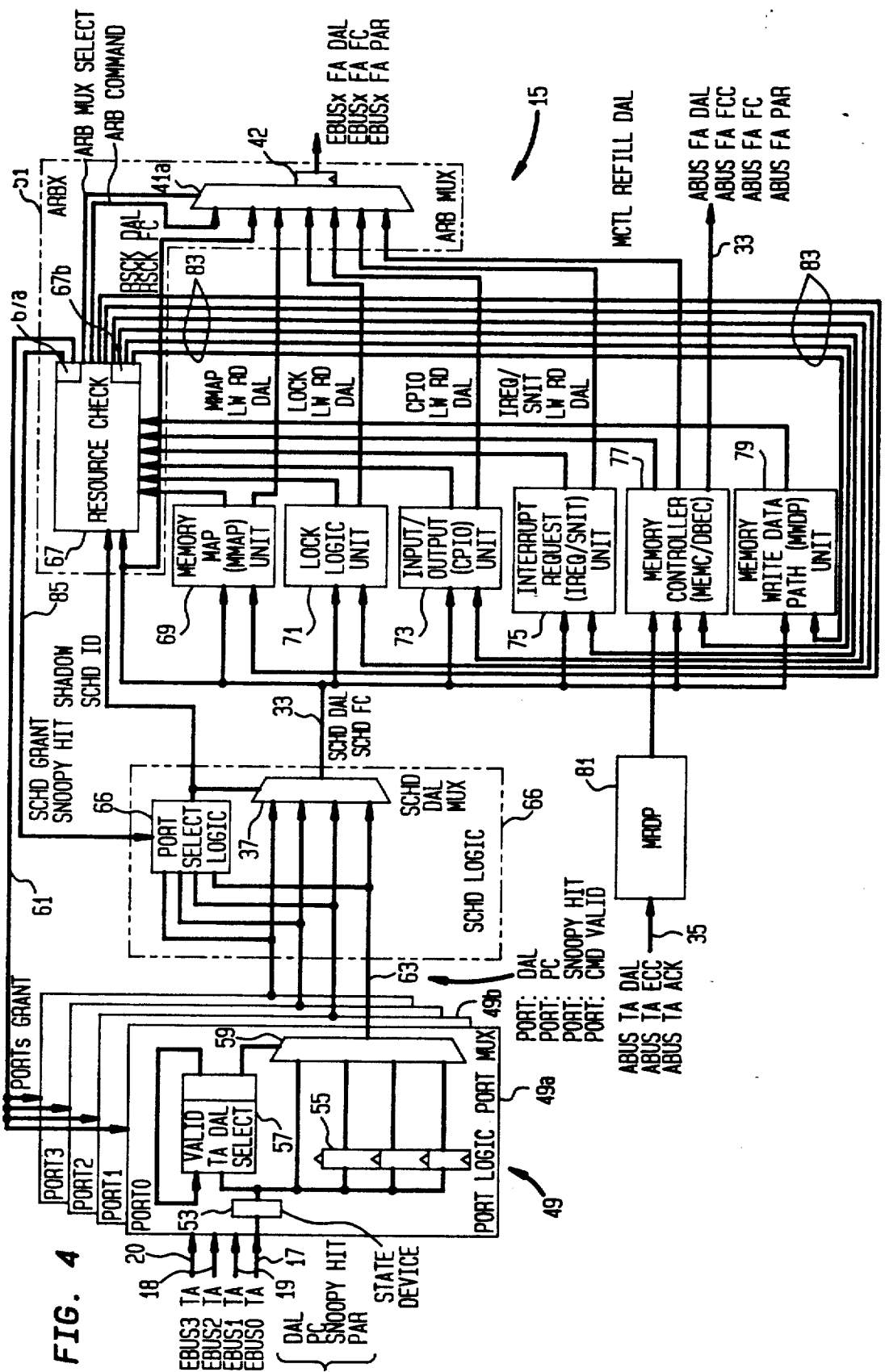
FIG. 4 is a more detailed block diagram of a portion of the central unit shown in FIG. 3.

FIG. 4 is a more detailed block diagram of the central unit 15 of FIG. 3. Logic element 50 in FIG. 3 includes as part thereof port select logic 65 that is shown in FIG. 4. Port select logic 65 is combined with multiplexer 37a to form scheduling logic 66.

Other logic included in the logic 50 of FIG. 3 is resource check logic 67. Resource check logic 67 combines with MUX 41a and state device 42 to form arbitrator 51.

Again referring to FIG. 4, E-BUS 0 TA bus 17, E-BUS 1 TA bus 19, E-BUS 2 TA bus 18, and E-BUS 3 TA bus 20 connect to port logic 49. Each of these E-BUS TA buses from one of the CPUs is connected to its own port of port logic 49. For example, E-BUS 0 TA bus 17 connects to port 49a, while E-BUS 1 TA 19 connects to port logic 49b.

Four types of information may be communicated on the E-BUS TA buses. These types are: (1) data, commands and address information ("DAL"); (2) FC information, which are signals to indicate whether the information on the DAL lines is a command, or address or data; (3) "snoopy hit"information, which indicates that a CPU associated with that bus has a "snoopy hit;" and n(4) parity information.

Although not shown, each of the CPUs may include a cache memory. These memories may be used to speed up access to data which is being used extensively by a CPU. Thus, each time a read command is sent out, each CPU checks to see if the associated address is in its cache. In a manner that will be explained in more detail below, this operation which is known as a "snoopy" operation, is done with timing that insures that any response to a "snoopy" read, which is a "snoopy hit," takes place before refill data returns from one of the memory modules in memory 31.

Again referring to FIG. 4, the information on buses E-BUS 0 TA bus 17, E-BUS 1 TA bus 19, E-BUS 2 TA bus 18, and E-BUS 3 TA bus 20 is input to state device 53. The output of the state device 53 is coupled to MUX 59 and to buffer 55. Buffer 55 can store up to three words of predetermined length.

The output of the state device 53 is also input to validity logic 57. The second input to validity logic 57 is a signal that is fed back from the output of validity logic 57. The other output of validity logic 57 connects to the selection inputs of MUX 59. The PORT GRANT signal on line 61, which is output from arbitrator 51, is also input to validity logic 57.

The function of validity logic 57 is to determine if commands and data are valid, and which of the data, either in buffer 55 or input directly to port MUX 59, are to be switched onto bus 63 at the output port MUX 59.

The output of port MUX 59 on bus 63 is input to MUX 37a. The output of port MUX 59 on bus 63 is also input to port select logic 65. MUX 37a and port select logic 65 are part of scheduling logic 66.

Port select logic 65, in response to outputs from the arbitrator 51, selects one of the four inputs to MUX 37a to be coupled to the output of that MUX. This is coordinated with the operation of validity logic 57 which controls the output of port MUX 59 on bus 63. Port select logic 65 grants the four ports supplying inputs to bus 63 access to bus 36 on a round robin basis.

Output bus 36 is input to resource check logic block 67 of the arbitrator 51, MUX 41a, and a number of other units. These units are memory map unit ("MMAP") 69, lock logic unit ("LOCK") 71, input/output unit ("CPIO") 73, interrupt request unit ("IREQ/SNIT") 75, memory controller ("MEMC/DBEC") 77, and memory write data path unit ("MWDP") 79. Each of the units 69, 71, 73, 75, and 77 also provide inputs to the MUX 41a.

Resource check 67 receives status inputs from MMAP 69, LOCK 71, CPIO 73, IREQ/SNIT 75, MEMC/DBEC memory controller 77, and MWDP 79. These are the memory module status, the lock register status, the I/O module status, the error status, the memory controller status, and the write buffer status messages, respectively. In addition, the resource check logic block 67 generates ARB (arbitration) commands for input to the MUX 41a and a ARB MUX SELECT command for selecting which input will be output from MUX 41a for input to state device 42.

A-BUS TA 35 is a 64-bits wide bus. The signals on that bus include DAL information, ECC (error correction code) information, and ACK (acknowledgement) information. The ACK bit is processed by memory read data path ("MRDP") 81. The output of MRDP 81 which includes the DAL and ECC information is input to MEMC/DBEC 77. The DAL information here is generally refill data. The output of MEMC/DBEC is the refill data and this output is one of the inputs to MUX 41a.

MEMC/DBEC 77 also provides an output on A-BUS FA bus 33. This output includes the DAL, ECC, FC, and parity information. This information on A-BUS FA bus 33 is input to memory modules 31a-f. The output of MUX 41a through the state device 42 includes the same information that MEMC/DBEC 77 put on A-BUS FA 33 except that the ECC information is not included.

When the appropriate command signal on bus 36 is input to resource check logic 67, the resource check logic uses the status information input from MMAP 69, LOCK 71, CPIO 73, IREQ/SNIT 75, MEMC/DBEC 77, and MWDP 79 to arbitrate between the different inputs to determine which input will be given access to E-BUS TA buses 21-24 through MUX 41a and state machine 42. The signals that desire access to these buses are the RSCK (resource check) DAL and RSCK FC signals on bus 36, MMAP LW RD (longuard read) DAL signal output from MMAP 69, LOCK LW RD DAL signal output from LOCK 71, the CPIO LW RD DAL signal output from CPIO 73, the IREQ/SNIT LW RD DAL output from IREQ/SNIT 75, and the METL REFILL DAL signal output from MEMC/DBEC 77. Resource check logic 67 controls access to these buses via the output lines coupled through state devices 67a and 67b and the ARB MUX SELECT signal output from resource check logic 67.

The outputs from state device 67a on line 61 and 85 are for controlling access of E-BUS TA bus information onto bus 36. The outputs from state device 67b on lines 83 are for causing selected DAL information from MMAP 69, LOCK 71, CPIO 73, IREQ/SNIT 75, and MEMC/DBEC 77 to be input to MUX 41a, for causing status updates for MMAP 69, LOCK 71, CPIO 73, IREQ/SNIT 75 and MEMC/DBEC 77, and changing the internal states of any of these blocks.

Figure 5:
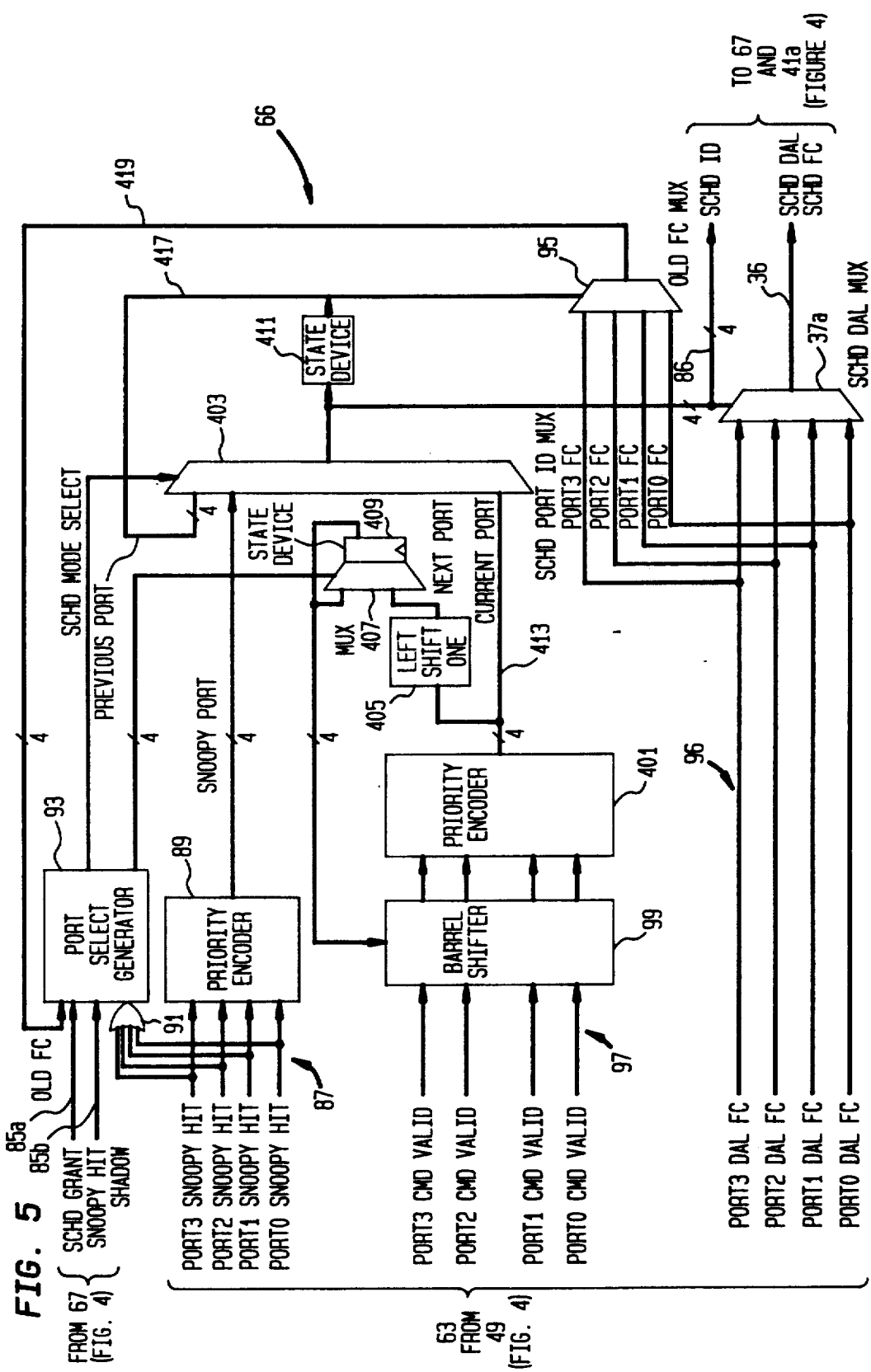
FIG. 5 is a more detailed block diagram of the scheduling logic shown in FIG. 4.

FIG. 5 is a more detailed block diagram of the scheduling logic 66 of FIG. 4. As stated, the scheduling logic includes as major elements port select logic 65 and MUX 37a. The output of the port logic 49 on bus 63 is input to scheduling logic 66. This input includes the port DAL signals, the port FC signals, the port "snoopy hit" signals, and the port CMD VALID (command valid) signals. The selection of which of these signals will be output from port logic 49 is determined by validity logic 57.

Referring to FIG. 5, lines 87 of bus 63 carry the port "snoopy hit" signals. These signals are inputs to priority encoder 89 and OR gate 91. The output of priority encoder 89 is input to MUX 403. The output of OR gate 91 is input to port select generator 93.

Lines 96 of bus 63 carry the DAL and FC signals. These signals are the inputs to MUX 37a. The FC lines signals are also input to OLD FC MUX 95.

Lines 97 of bus 63 carry the port CMD VALID signals. These signals are inputs to barrel shifter 99. The output of barrel shifter 99 is input to priority encoder 401. The 4-bit output of priority encoder 401 is one of the inputs to MUX 403. This 4-bit output is also input to left shift one block 405. The output of left shift one block 405 is one of the inputs to MUX 407. MUX 407 has state device 409 disposed at its output. The output of state device 409 feeds back as the second 4-bit input to the MUX 407 and as a control input to barrel shifter 99.

The first 4-bit input to MUX 403 is a feed back signal from state device 411. This is the last input to MUX 403. The 4-bit output of MUX 403 is input to state device 411. The cycle after the output from MUX 403 is input to state device 411, it is provided at the output of the state device. The 4-bit output of state device 411 is also input to the selection inputs of OLD FC MUX 95 which has as inputs the FC signals from lines 96 of bus 63.

The output of MUX 95 on line 419 is the OLD FC signal. This is an input to port select generator 93 along with the output of OR gate 91 and two other inputs. These two other inputs are the SCHD GRANT signal on line 85a and SNOOPY HIT SHADOW signal on line 85b. Both of these signals are output from state device 67a of arbitrator 51. These signals are for controlling access of the E-BUS TA buses to bus 36.

The first output of port select generator 93 is the selection input of MUX 403. The second output is input to the selection input of MUX 407. The control of these two MUXes determines the content of the output from MUX 37a on bus 36 and what the 4-bit SCHD ID signal on line 86 will be. The output of MUX 403 is input to the selection input of MUX 37a whose output is bus 36.

Referring to FIGS. 4 and 5, the operation of the scheduling logic shown at FIG. 5 will now be discussed. Assuming the system is activated and awaiting operating instructions, the port CMD VALID signals on the lines 97 of bus 63 are input to barrel shifter 99. This is the initial action because the first thing that must be determined is which commands and data are valid since only those ports having valid commands and data can be granted access to the bus 63. Hence, each port CMD VALID signal is evaluated to determine if it has the proper state indicative of valid commands and data.

Assuming that all four ports have valid commands, priority encoder 401 prioritizes the ports with the highest priority being output first from the priority encoder on line 413 as the "current port" signal. This is also input to left shift one block 405. The output of the left shift one block is the next port in the sequence. So, the output of the left shift one block is the "next port" signal, which is input to MUX 407. The other input to MUX 407 through state device 409 is a feed back signal. This signal also connects to the control inputs to barrel shifter 99. Hence, the signal will cause the barrel shifter to point to the port associated with this signal. The signal that usually is at the feed back loop is the "current port". This is true until changed by the selection of the "next port".

As an example, assume that the priority encoder 401 determines that port "0" should have access to bus 36 first. The 4-bit output of priority encoder 401 is input to,left shift one block 405 and, as such, will shift left one block to indicate the next port which according to a normal sequence would be port "1."

The output of left shift one block 405 is loaded into the second input to a MUX 407. The first input to MUX 407 is the current port, which is port "0," and is the present output of MUX 407 and latched in state device 409. This signal is fed back to an input of MUX 407. The state device continues to feed back port "0" until the port "0" information has been fully transmitted. This is controlled by port select generator 93 continuing to select the feed back input until port "0" has completed placing its data on bus 36.

When port "0" has completed its transmission, port select generator 93 selects the second input to MUX 407 which is the output of left shift one block 405. This will now provide the "next port," port "1," at the output of MUX 407. On the next cycle, the "next port" signal will be output from state device 409 and fed back to the first input to MUX 407.

When this value designating port 1 is output from state device 409, it is also input to the barrel shifter 99. The new port designation signal advances the barrel shifter by one, so long as the "next port" in the normal sequence order has a valid port CMD VALID signal. If the next port in sequence is not valid, the barrel shifter advances to the next valid port.

The output of the barrel shifter 99 is input to priority encoder 401 which now provides an output representative of the new port. As such, the newly selected port becomes the "current port" and a new "next port" is selected in the above described manner. This method of operation would continue with each port having its turn in round robin fashion.

The output from port select generation 93 that is input to the selection input of MUX 403, usually selects the "current port" input for output from that MUX. This "current port" output will select its signals for output from MUX 37a on bus 36. It is only when other events take place that the other inputs to MUX 403 are selected for output as will be described.

Now that the method by which a port is given access to bus 36 has been described, the operation of scheduling logic 66 will be discussed.

Each command is usually followed by at least one word. This word may be an address, or data (in the case of a refill). This address or data may be followed by additional data (in the case of a write command), a refill command, or a SWAP command (a combined read and write command).

Once a port is given access to the bus, it must continue to be given access until it is finished transmitting its commands or data onto bus 36. For example, in the case of a SWAP command, the port must have continuous access to send the SWAP command, a read address, a write back command, a write address, and then the write data. During the time that the data and commands are being sent, FC changes states according to what is on the DAL lines. If it is a command, it has one state and the other state if it is not a command.

The purpose of the MUX 403 is to select between a "previous port", a "snoopy port", and the "current port". As stated, it is only when predetermined events take place that the "previous port" or "snoopy port" inputs to MUX 403 are selected. The method of selecting the output of MUX 403 will now be discussed.

The output of MUX 403 is input to the selection inputs of MUX 37a. This determines which port is granted access to bus 36. Normally, the output of MUX 403 is the "current port"; hence the "current port" is selected at MUX 37a. The "current port" is also input to state device 411. On the clock cycle after the "current port" is input state device 411, with the output therefrom on line 417. This output is input to the selection inputs of OLD FC MUX 95 and fed back as the "previous port" put to MUX 403.

After passage of one cycle, the information being transmitted on the port selected at MUX 37a is data or addresses, and not a command. Accordingly, the FC signal will change states. This new state will be input to port select generator 93. This will cause the SCHD MODE SELECT (scheduling mode selector) output of the generator to have a bit pattern that will select the "previous port" input to MUX 403 which is latched in state device 411. The "previous port" value will remain as the output of MUX 403 until the state of the FC signal on line 419 changes signifying the end of data and the presence of a new command. It is only then that port select generator 93 will change its selection signals to select the "current port" rather than the "previous port." This action ensures that data transmission is complete before another command is placed on bus 36.

In the meantime, in response to the change in state of the FC signal on line 419, the "next port" value is selected at MUX 407. This is done by port select generator 93 changing which output the selection signals selects to be output from MUX 407. Once selected, the "next port" signal, through state device 409, is fed back to MUX 407 and barrel shifter 99. Barrel shifter 99 then selects the next valid port, which now becomes the "current port" on line 413. The scheduling logic 66 now awaits the next change in the state of the selected FC signal for repeating these actions. As an example of the operation of scheduling logic 66, the following is provided.

During normal operations, without a "snoopy hit," when the "current port", e.g., port "0", is selected and coupled through MUX 403, this "current port" signal makes the selection of the "current port" DAL and FC at MUX 37a. On the next clock cycle, this port designation, i.e., port "0", is available at the output of state device 411. The output of state device 411 selects the corresponding port FC signal to be output from MUX 95. Thus, if port "0" is the current port, the FC bit for port "0" will be output from MUX 95 and fed back to port select generator 93.

During the first cycle, which contained a command, the FC bit, for example, may be a logic "1" value. On the second cycle, when other than a command is transmitted, it will change to a logic "0" value.

When the port "0" FC signal switches, this changed value is input to port select generator 93. In response to this change, port select generator 93 will select the "previous port" input that is output from state device 411. Hence, the output of MUX 403 is the "previous port" input. This all results in a holding period so that all of the port "0" information can be transmitted. Once the FC signal changes states to indicate that a command is again being transmitted, the output from port select generator 93 to the selection inputs of MUX 403 will again select the "current port" input, which now is port "1". The process repeats itself for each of the ports taken in round robin fashion.

The remaining portions to be discussed regarding FIG. 5 relate to granting "snoopy hits" access to bus 36. With regard to normal operations, access of the ports to a bus 36 was predicated on the SCHD GRANT (scheduling grant) signal on line 85a from arbitrator 51 having the proper state.

"Snoopy hits" are given priority over normal commands and data. Accordingly, the SNOOPY HIT SHADOW signal, when it has the proper state, will prevent any commands or data from being placed on bus 36.

A "snoopy hit shadow" is a time which covers the period required to obtain signals back from the CPUs when there has been a "snoopy hit". That is, once a read command is put out on the bus, there is a certain amount of time before a signal will come back indicating a "snoopy hit", i.e., the requested data is in a CPU cache. If there is a "snoopy hit", a "snoopy refill command" will occur so the identified data may be provided.

Figure 6:
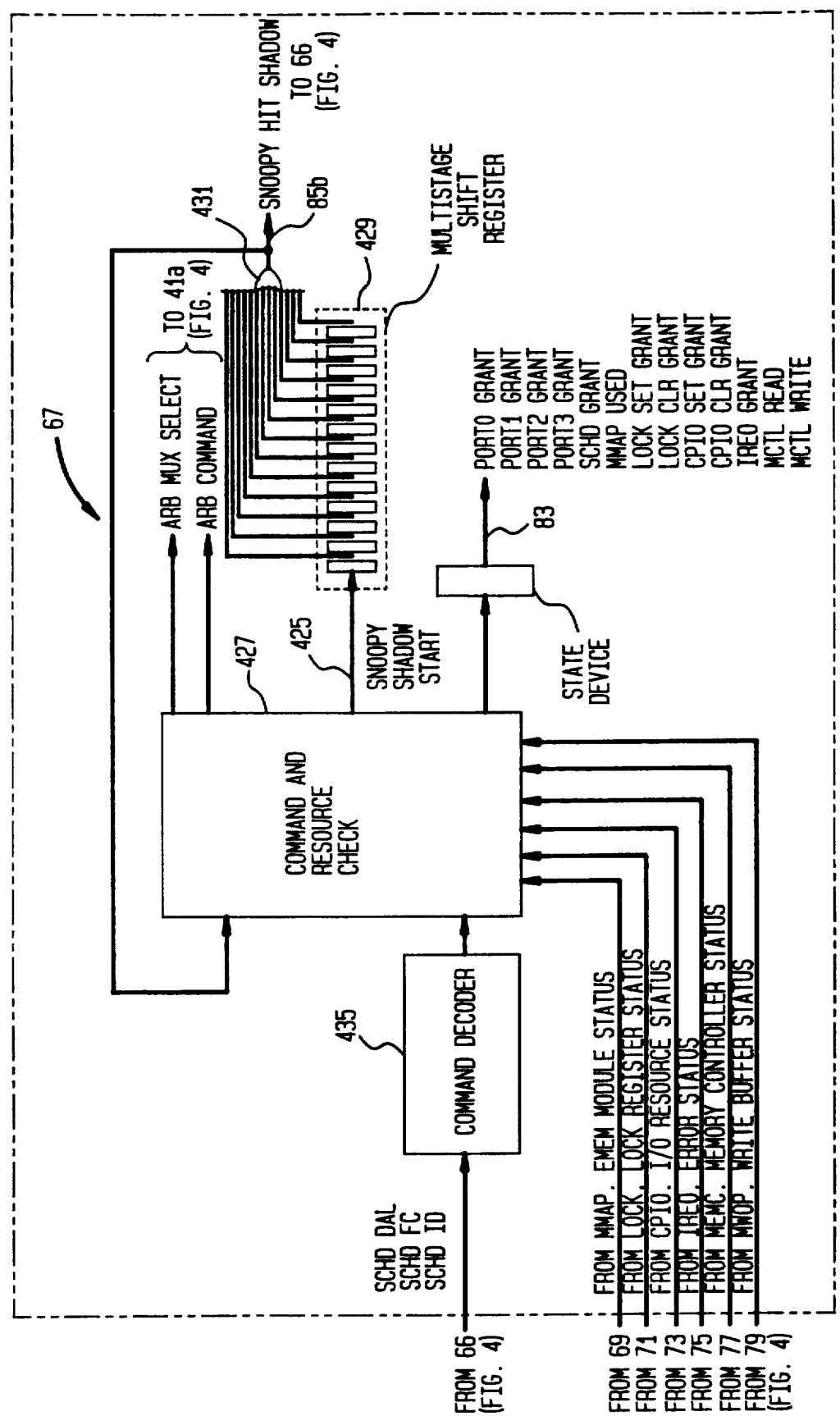
FIG. 6 is a more detailed block diagram of the resource check logic shown FIG. 4.

FIG. 6 is a more detailed block diagram of resource check logic 67. Referring to this Figure and FIG. 5, the method for generating of a SNOOPY HIT SHADOW signal will be discussed.

Once a read command is issued and detected in command decoder 435, a "snoopy shadow" period is started. One of the outputs of command and resource check 427 is the "snoopy shadow start" signal on line 425. This signal is input to multistage shift register 429. The outputs of shift register 429 are combined in OR gate 431. The output of OR gate 431 is fed back to the command and resource check 427 and also is output from resource check logic 67 on line 85b as the SNOOPY HIT SHADOW signal.

Again referring to FIG. 5, during the "snoopy hit shadow" time, any of the ports requesting access to bus 36 cannot be given such access because "snoopy hits" take priority. Only after the "snoopy hit shadow" time has expired, as indicated by the status of the signal on line 85b, will port select generator 93 be enabled to advance to the next port.

If there are more than one "snoopy hit", priority encoder 89 outputs a signal indicative of the "snoopy" port that has been assigned the highest priority.

When there has been a "snoopy hit" identified, the output of OR gate 91 will change state. In response to the change of state of the OR gate 91 output, port select generator 93 now selects the correct "snoopy" port for access to the bus 36 through MUX 403 and MUX 37a. That is, the "snoopy port" output from priority encoder 89 will be coupled to the output of MUX 403. This output will select the port corresponding to the correct "snoopy hit" for output through MUX 37a. The selected "snoopy port" will then send out its refill data on bus 36.

Again referring to FIG. 4, command and resource check 427 (not shown), which is part of resource check logic 67, receives status inputs from MMAP 69, LOCK 71, CP10 73, IREQ/SNIT 75, MEMC/DBEC 77, and MWDP 79. The command from scheduling logic 66 that has been decoded by command decoder 435 is also input to command and resource check 427. This command may be from a particular CPU or port wishing to put a command and address on bus 36. For the present invention, the memory module status outputs from MMAP 69 have the most impact.

As indicated in FIG. 1, there are a number of memory modules (memory modules 31a-f). In a preferred method of operation of the system and method of the present invention, a second read command is not placed on the bus for the same memory module to which a prior active read command has been directed until a predetermined time period has passed. This time period includes memory latency and the time that it takes the memory to provide the refill data.

The nature of the memory control is to control a number of commands that are pending at one time, and yet allow only one command pending for any given memory module. To achieve this preferred type of memory control, command and resource check 427 decodes commands and their associated addresses to determine if it can grant the port requesting access, access to the memory bus based on the number of commands then pending and the availability of a specific memory module.

Again referring to FIG. 4, the ARB MUX SELECT (arbitration multiplexer select) output is input to the selection inputs to MUX 41a. The inputs to MUX 41a are the RSCK DAL and RSCK FC from bus 36, the MMAP LW RD DAL signals from MMAP 69, LOCK LW RD DAL signals from LOCK 71, CPIO LW RD DAL signals CPIO 73, IREQ/SNIT LR WD IREQ/SNIT signals 75, and MCTL REFILL DAL signals from MEMC/DBEC 77. Of these inputs, important for consideration in the present invention is the selection between the RSCK DAL signal output from scheduling logic 66 on bus 36 and the MCTL refill data output from MEMC/DBEC 77. This will be discussed in greater detail with respect to FIG. 10.

For the purposes of discussing selection of the output of MUX 41a, it is understood that if MEMC/DBEC 77 is providing refill data, then none of the ports can be granted access to the bus via MUX 41a. Thus, during the transfer of refill data through the MUX 41a, line 61 and 85 are controlled to ensure that all of the refill data is put onto the E-BUS FA buses 21-24 before a port is given access.

The following are examples of processing commands and data according to the system and method of the present invention and, in particular, according to the system shown in FIGS. 3-6.

If one of a number of CPUs wants access to the bus 36, it sends out a command followed by an address in two successive cycles. This command and address will be on E-BUS TA buses 17-20.

There are basic commands which involve memory transfers. These are the read commands, write back commands in which data is written from one CPU to memory, refill commands in which data is written to one CPU from either memory or another CPU, and SWAP command. These commands will be described in conjunction with the appropriate Figures Referring to FIG. 7, a timing diagram for a read command is shown. For the purposes of this example, let it be assumed that CPU 1 is sending out a read command. At the first cycle, CPU 1 sends read command 101 followed by address 103 at the second cycle. At the second cycle, the command is arbitrated as indicated at 105. The arbitration will be between the CPUs competing for access to bus 36. The read command is loaded into the first buffer location of buffer 55 and the read address is loaded into the second buffer location of that buffer (see FIG. 4). Buffer 55 can hold up to three words in its three buffer locations, but only two of those locations are used here.

Figure 7:
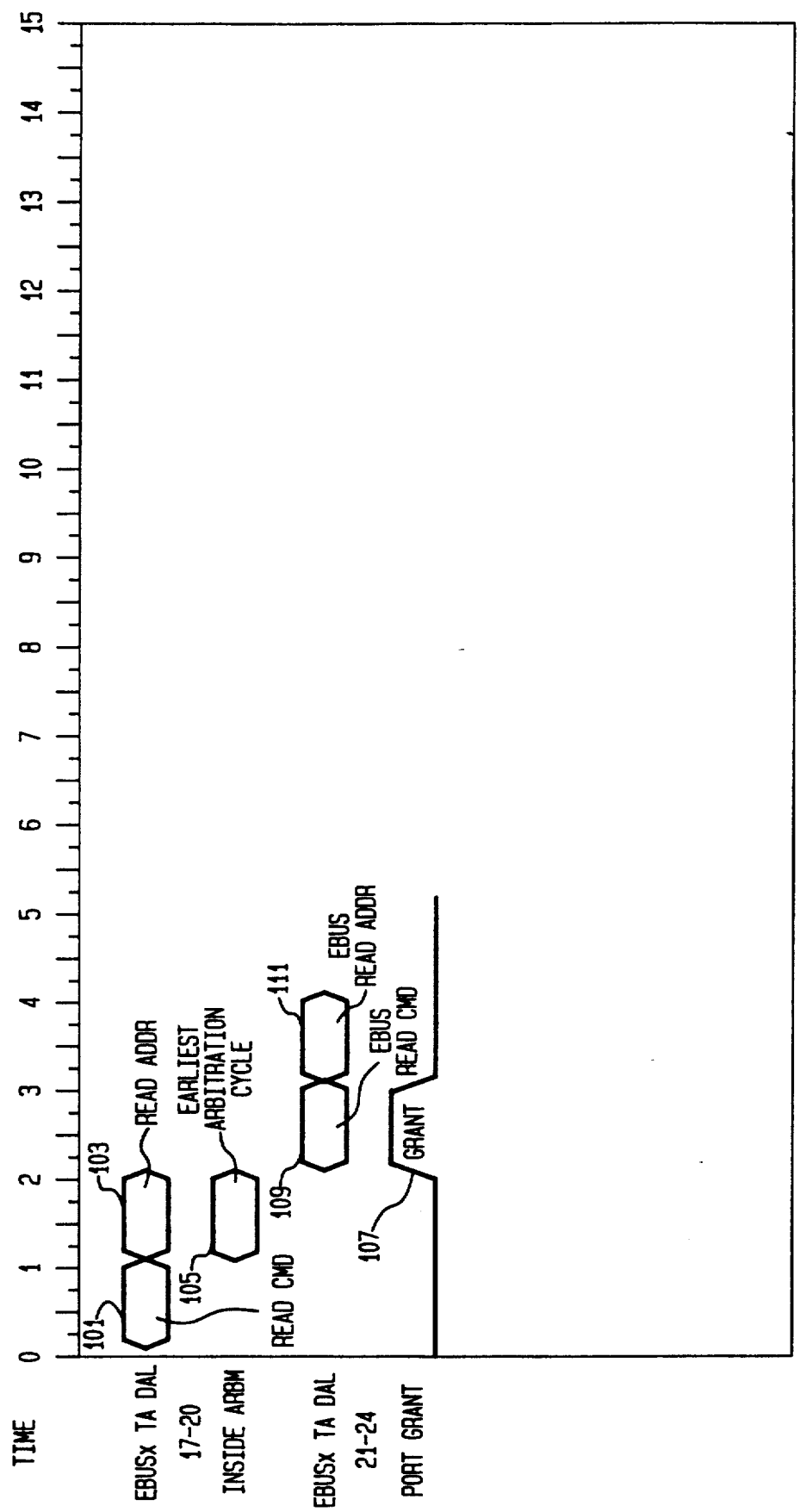
FIG. 7 is a timing diagram for read command timing.

If the command is valid, as determined by validity logic 57, and the requested memory module is available, at the third cycle, the CPU 1 port is granted access to bus 36 as shown at 107 of FIG. 7. This is done by coupling the read command directly to bus 36 through MUXes 59 and 37a (FIG. 4). This command is then coupled through MUX 41a reaching E-BUS FA buses 21-24.

During the next cycle, the address from the second buffer location of buffer 55 in port logic 49 is put on bus 36 as indicated at 111. The read command at 101, which the CPU put on one of the E-BUS TA buses during the first cycle, appears on each of the E-BUS FA buses 21-24 during the third cycle. In this way, the CPU which sent the original command will know, as will all of the other CPUs, that the request has been granted and that the requesting CPU has been given access to bus 36. This is done without the necessity of making a separate communication to each CPU. Also, the read command and address at 101 and 103, respectively, are provided to each of the other CPUs so that they may determine if they have the requested information in their caches for the purpose of a "snoopy hit."

If it is a write command, the first piece of data is sent on a third cycle. The remainder of the data is provided in subsequent cycles. The write command and address will be processed in the same manner as a read command and address. The data, however, will be written to memory and not returned.

Figure 8:
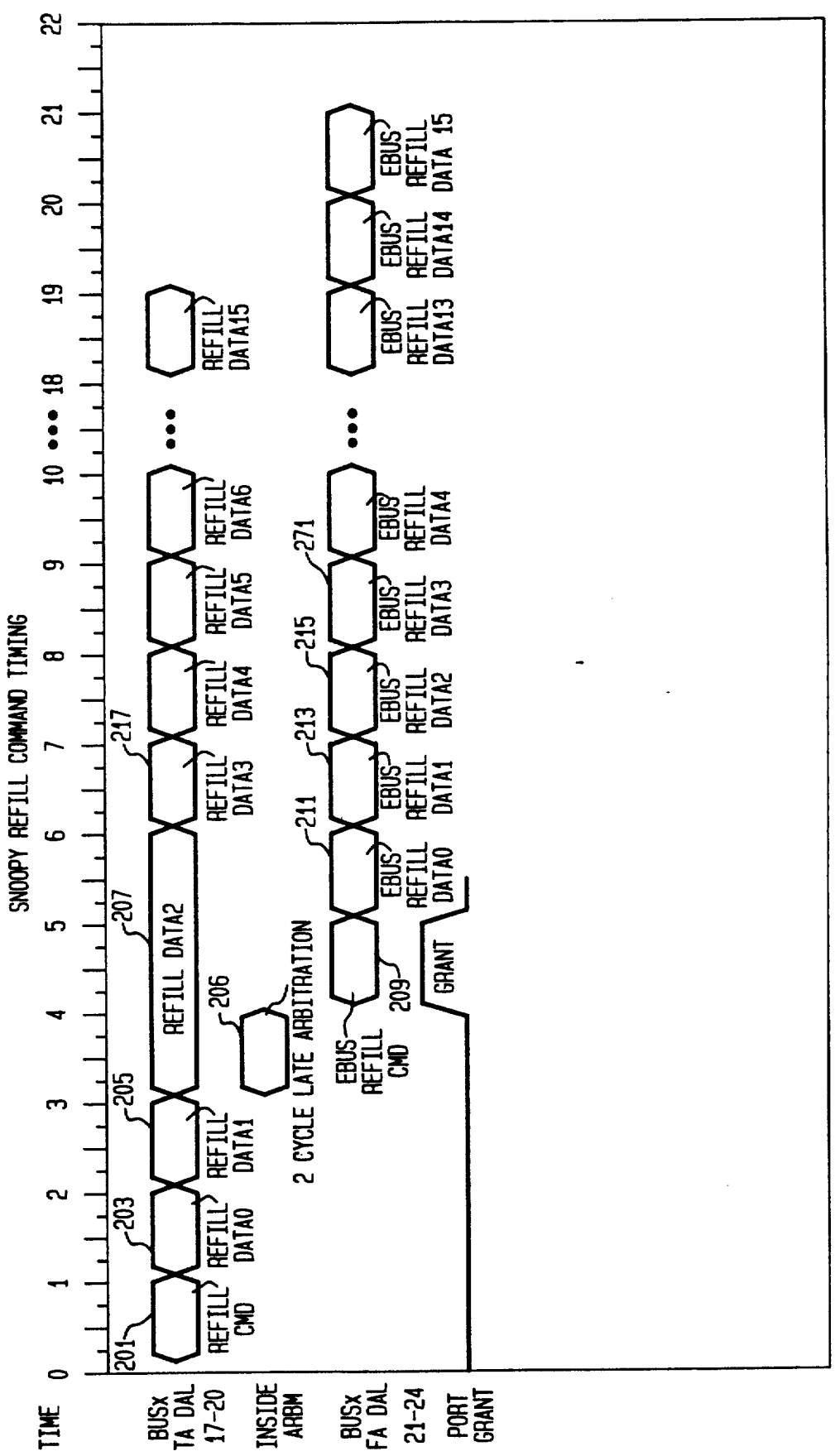
FIG. 8 is a timing diagram for snoopy refill command timing for snoopy hits.

FIG. 8 is a timing diagram for "snoopy" refill command timing. Referring to this Figure, the processing of "snoopy hits" will be discussed. As stated, a "snoopy hit" occurs when a CPU has the address associated with a read command in its cache memory. The CPU that has the data in its cache responds to the read command by putting out a "snoopy refill" command followed by refill data on its E-BUS TA bus.

Starting with the first cycle shown in FIG. 8, refill command 201 is output from a CPU and input to the first buffer location of buffer 55 (FIG. 4), then a predetermined number cycles of refill data are output. The data is output at a rate of four bytes per cycle. As shown, the first refill data 203 is output at the second cycle and this first data is input to the second buffer location of buffer 55 (FIG. 4), second data 205 at the third cycle is input to the third buffer location of buffer 55 (FIG. 4), and third data 207 at the fourth cycle is held at state device 53 (FIG. 4). The remainder of the data is output at subsequent cycles.

As an example, assume bus 36 was busy when refill command 201 was sent from CPU 3 at 14. As a result, CPU 3 at 14 will have to wait for access to the bus. Accordingly, the refill command, data "0", and data "1", are sent and held in the buffer 55 in port logic 49, as stated, until access is granted. This buffer of port logic 49, as stated, can hold 3 words.

Because the bus was busy, the earliest times at which arbitration can take place is at the fourth cycle. Thus, CPU 3 was given access to the bus 36 two cycles after it asked for it (two cycles late).

In the meantime, at the fourth cycle, the third piece of refill data "2" as 207 has been placed on the bus and is held in state device 53 (FIG. 4) because the buffer can only hold 3 words and, therefore, it is full. Once arbitration takes place at 206 and arbitrator 51 gives CPU 3 access to the bus 36, the refill command is available on all E-BUS FA buses 21-24. This takes place at the fifth clock cycle.

At the fifth cycle, the refill command is latched in state device 42. This refill command, indicated at 209, is transferred from the first buffer location. Similarly, the refill data "0" at 211 is transferred from the second buffer location in buffer 55 and the refill data "1" at 213 is transferred from the third buffer location. At the seventh cycle, the refill data "2" is transferred into the state device 42. It, therefore, is ready for output on the E-BUS FA at the next cycle, as shown at 215.

During the fourth cycle at 206, when arbitrator 51 granted the port access to the bus via line 61, validity logic 57 (see FIG. 4) coupled the input from the first buffer location in buffer 55 (see FIG. 4) through MUX 59. Hence, this input is output from the MUX on bus 63. On the next cycle, the input in the second buffer location of buffer 55 is coupled and in the following cycle, the input in the third buffer location is coupled. After that, the output of state device 53 is coupled through the MUX.

The CPU that sent the refill command and refill data knows to begin sending data again beginning at seventh cycle, as indicated by refill data 217. The refill command was placed on E-BUS FA buses 21-24 at the fifth cycle, as indicated at 209. During the sixth cycle, the CPU 3 read this data and at seventh cycle began sending data again. Now, the two late cycle problem has been corrected. This is why refill data 2 at 207 appears 3 cycles long instead of one cycle. This data at 271 appears on the bus 36 just after data 215 as shown. The remaining refill data is passed through without the use of the buffer. The use of the buffer and the bus system of the present invention assures that, once the bus is granted to a CPU, there is a continuous flow of data and commands.

Figure 9:
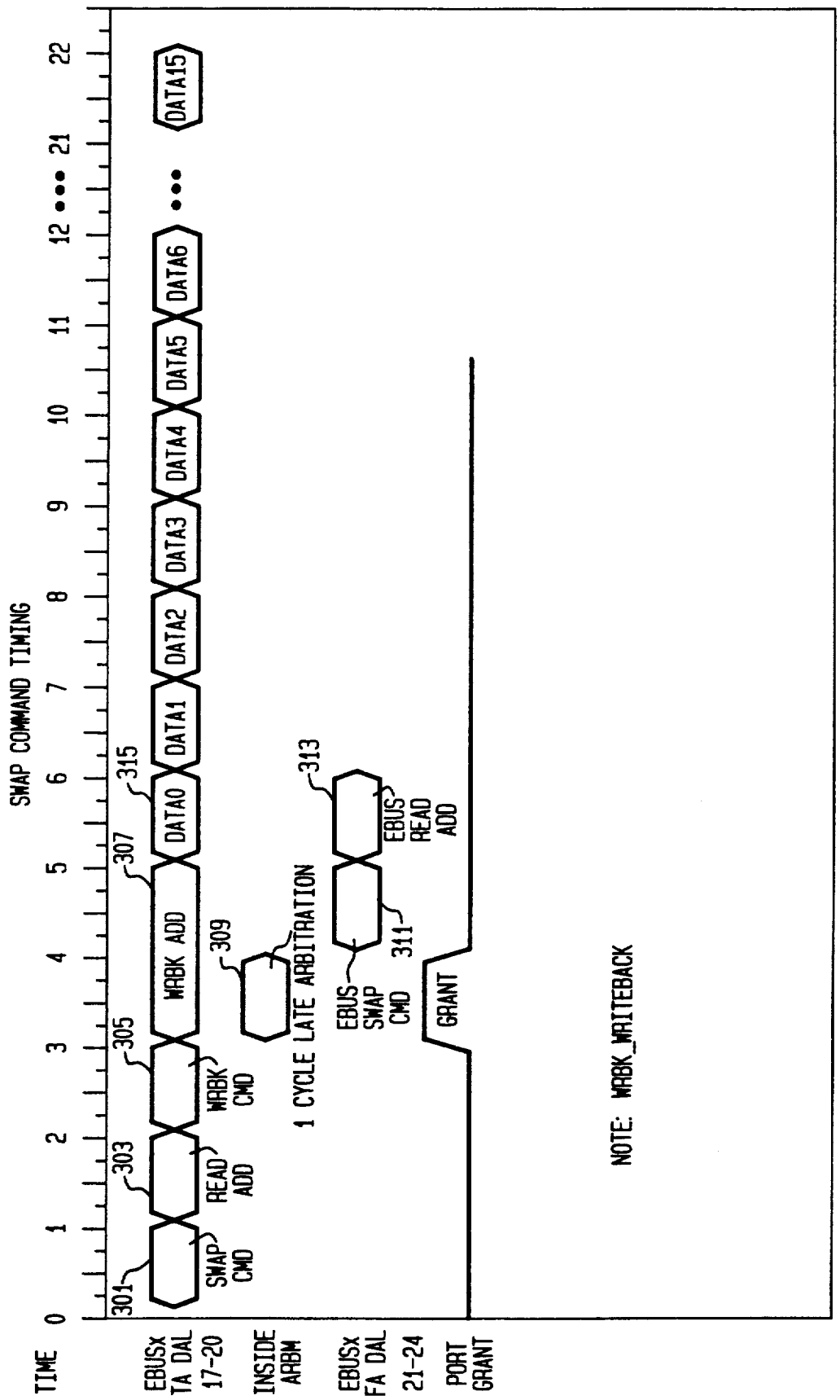
FIG. 9 is a timing diagram for a SWAP command timing.

FIG. 9 shows the timing for a SWAP command. SWAP command 301 is input to the first buffer location of buffer 55 at the first cycle and read address at 303 is input to the second buffer location at the second cycle. A write back command at 305 is input to the third buffer location of buffer 55 at the third cycle. At the fourth cycle, the write back address at 307 is held on E-BUS TA bus 18, for example, for CPU 2. The reason it was held here will be explained subsequently.

This diagram shows a one cycle late arbitration. On the cycle after arbitration, the SWAP command appears on the E-BUS FA buses 21-24 at 311 followed by the read address at 313. Similar to the situation in FIG. 5, the sending CPU knows that access has been granted and thus, beginning at sixth cycle time, it can begin sending data again as shown at 315. At this time, the one cycle late arbitration problem is corrected.

Data does not appear on the E-BUS FA buses. This is because the data is being written to memory. Accordingly, the data is coupled from bus 36 directly into the memory controller 45, and it is not coupled through MUX 41a and state device 42 onto the E-BUS FA buses 21-24.

The system and method of the present invention uses dead reckoning in communicating with memory modules 31a-f. The implementation of dead reckoning is manifest in that, once a read command is sent out to a memory module, refill data is expected to be returned at an exact, predetermined time. The manner in which the present invention keeps the bus full without queues will be explained.

Ideally, when the system of the present invention is doing a series of reads, the bus is full at all times. That is, there should be a period of time during which refill data comes onto the bus from one memory module, an adjacent period during which a new read command and address are put on the bus, immediately followed by more refill data, and so on. Coupled with the desire to have no dead space on the bus, there is a desire to avoid the creation of queues in the memory controller.

Queues can be avoided by waiting for one command to finish before starting the next. However, the bus would not remain full. There would be empty cycles. In the present invention, arbitrator 51 (see FIG. 4) ensures that the read commands are supplied over bus 36 to the memory controller 77 at a predetermined rate so that queues are not formed at memory controller 77. Moreover, particularly during start-up, it is necessary that a sufficient number of commands be output from memory controller 77 to ensure that the bus remains full. To do this, there are two things that must be considered: (1) the memory latency time, and (2) the refill data time.

The refill data time, including the command overhead, for example, is 18 cycles. The command overhead is the time that is needed to put a new command and address on the bus. Hence, during continuous operations, read commands and addresses should go out every 18 cycles assuming no variation in read access time ("RAT").

During such continuous operations, however, the "snoopy hit" time must also be considered. In other words, a "snoopy hit" must be detected and returned before the refill data comes back from the memory array or the need for a cache memory system to provide quick access to the most accurate data is obviated. Since a "snoopy hit" is detected and returned in less than 18 cycles, this is not a problem during steady state, but could be a problem during start-up.

Figure 10:
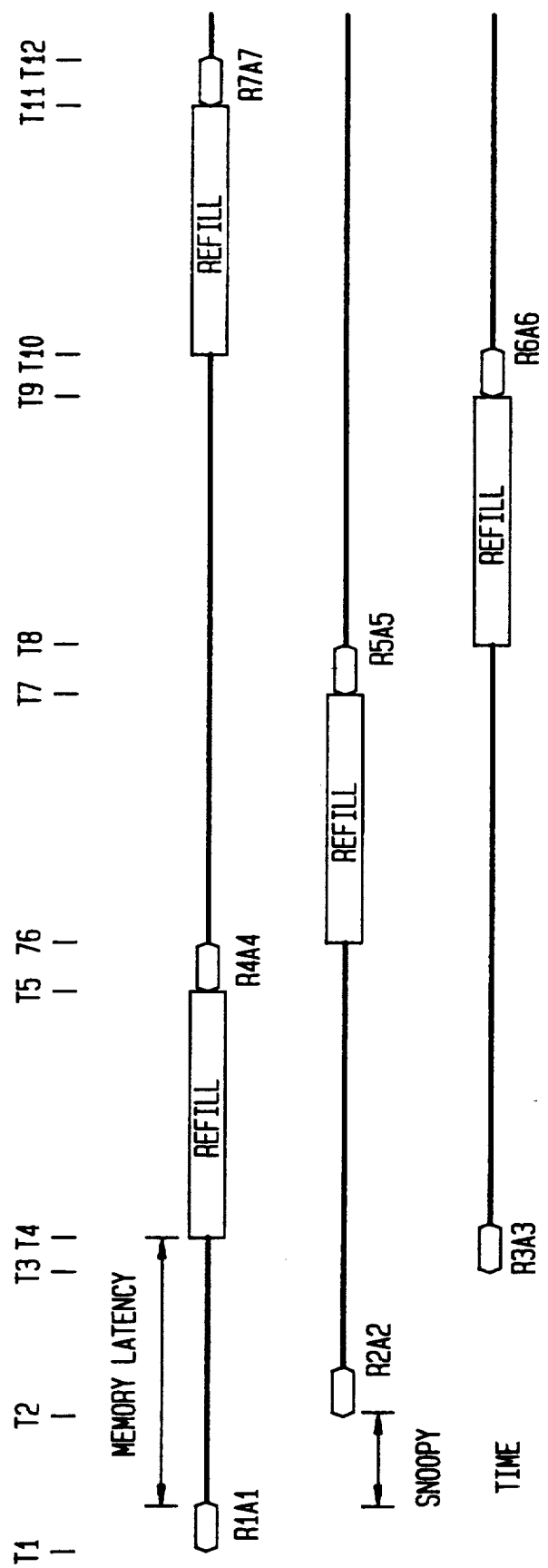
FIG. 10 is a timing diagram for no dead space on a shared bus.
Figure 11:
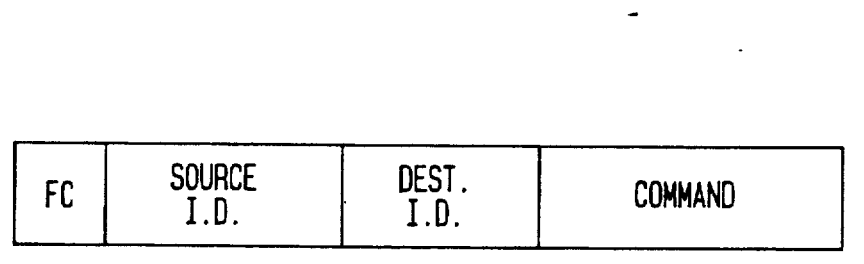

The timing diagram for start-up operations is shown at FIG. 10. Referring to that Figure, a command and address RIAI are sent out at time T1. The contents of that command are shown in FIG. 11. The command field includes a FC bit, source ID bits, destination ID bits, and the command bits. The FC bits indicate the status of this command. The source ID permits a CPU to know when its own command has been placed on the bus and therefore, granted access to the bus. The destination ID lets indication of the destination for the command.

Again, referring to FIG. 10, the manner of ensuring that there is no dead space on the bus at start-up will be discussed.

After the first read command and address RIAI are put on the A-BUS FA bus 33 at time T1, there will be a memory latency period followed by refill data. When the read command goes out, as indicated on FIG. 10, a "snoopy hit shadow" time starts. The running of the "snoopy hit shadow" prevents other reads from being placed on the bus until after the "snoopy hit shadow" time is up. This is because if a "snoopy hit" occurs, that "snoopy port" must be given immediate access to the bus to provide its "snoopy refill data" prior to the time that the refill data is returned from memory.

Memory latency is sufficiently long and, in fact, the refill data time itself is longer than the "snoopy hit shadow" time. For example, the "snoopy hit shadow" time may be 13 cycles while the refill data time is 16 cycles, not counting the two cycles for the next command and address.

As soon as the "snoopy hit shadow" time has expired for the first command at T2, the second command R2A2 is sent out. It is not necessary to wait for the refill data to come back in response to the first command before sending out the second command. The second read command R2A2, however, must be directed to a different memory module than R1A1. Arbitrator 51 (FIG. 4) tracks commands via the memory module status input from MEMC/DBEC 77 and controls the bus so that two commands are not sent to the same memory module.

After command R2A2 is sent out, there is a wait for the "snoopy hit shadow" time to expire before a third read command and address R3A3 can be sent out. As shown in FIG. 10, read command R3A3 was not sent out until time T3 which was after the "snoopy hit" time expired.

There are three state machines in MEMC/DBEC 77 that handle three separate read commands. In operations, MEMC/DBEC 77 sends out the first read command immediately upon receipt, resulting in the refill occurring at time T4. After that, two empty cycles are provided in order to allow MEMC/DBEC 77 to put another read command and address R4A4 on the bus at time T5. This is followed by refill data that starts at time T6. This refill data is in response to the command R2A2.

After the refill data for the R2A2 command ends at T7, another two cycle space is provided to send out a fifth command R5A5. The command R3A3 results in refill data starting at time T8. After the return of that refill data is complete, another command R6A6 can be sent out at time T9. Once this command is sent out, the refill data in response to the command R4A4 begins to return at time T10. The system continues to operate in this manner to keep the bus full.

The time between the first command RIAI and the beginning of its responding refill data, which is the memory latency, is less than the time between the command R2A2 and the beginning of its responding refill data. Similarly, the time between R3A3 and the beginning of its refill data is greater than the memory latency. This method allows the bus to be full with no dead space even at start-up.

According to the present invention, the commands R1A1, R2A2, R3A3, . . . R(N)A(N) are output from the MUX 37a and input to MEMC/DBEC 77 in a controlled manner. This is as soon after the "snoopy hit shadow" time as possible. Therefore, at start up, three commands are supplied to the memory controller fast enough so that there will be no dead space on the bus. At the same time, the arbitration logic ensures that no more than three commands are pending at one time to prevent the need for queuing. Therefore, command R4A4 is not permitted to be put on the bus until refill data in response to R1A1 has been completed. It is only at that time that one state machine is free to receive the command and steady state conditions are achieved.

The information that is shown in FIG. 10 is what appears on the E-BUS FA buses 21-24 at the output of MUX 41a. It is necessary to have both the refill data and commands on the E-BUS FA buses 21-24 so that they can be provided to all of the CPUs. This is why there must be time for the commands between refill data, if not, it would have to be handled separately and there would be dead space on the buses.

If all memory modules have the same read access time ("RAT"), it would be only necessary to stagger reads by the refill data time plus command overhead to prevent collisions on A-BUS TA bus 35 and on the E-BUS FA buses 21-24. The RAT is part of the memory latency time.

Since all memories of a memory array do not always have the same RAT, the present invention permits each memory module to have one of four different RATs. Since there are four different RATs, the simple staggering scheme described above will not work. If that scheme was used alone and a read was sent to a memory module with the longest RAT followed by a read staggered by the refill data time that was sent to a memory module with a shorter RAT, there would be a collision of data on A-BUS TA bus 35. The system and method of the present invention avoid collisions of this type without creating wasted cycles.

In accordance with the present invention, at the time of initializing the system, the predetermined RAT for each of the memory modules is stored in dedicated registers in MMAP 69 of the arbitration logic: there is one RAT stored for each memory module.

When a memory read command is being arbitrated, the memory address selects the correct register and the value of the corresponding RAT is sent to the MEMC/DBEC 77 of arbitrator 51 along with the memory read command and address. This RAT for a memory module is supplied to MEMC/DBEC 77 from resource check logic 67 via state device 67b on bus 83a. This resource check logic output is based on the status signal for MMAP 69 that is sent to resource check logic 67.

The memory controller (MEMC/DBEC 77) then transmits the command and address on A-BUS FA bus 33 and sets a loadable shadow counter with a value on the RAT. This shadow counter is a separate counter. Once this counter overflows, the read data is valid on A-BUS TA bus 35 and such data is captured by the MEMC/DBEC 77 and sent out from MEMC/DBEC 77 on E-BUS FA buses 21-24 as memory refill data.

The scheme for memory modules with different RATs will now be described. This aspect of the present invention can be described in terms of a logic table (Table 1) and the corresponding shadow counter count. the shadow counter creates a shadow whose time is determined by the refill data time plus the RAT of the memory module. For each read command and address that are released on A-BUS FA bus 33, a shadow is created, and another memory read command and address cannot be released until the shadow is cleared. In some cases, the shadow does not have to be as long as the refill data time plus the RAT and, in other cases, it must be longer. In order to determine the length of the shadow period Table 1 is provided.

TABLE 1

| PRESENT RAT <1:0> | SHADOW COUNTER <4:0> | NEXT RAT <1:0> | NEXT RD VLD | COMMENT |
|---|---|---|---|---|
| 00 | 10010 | XX | 0 | shadow clear @ cycle 18 |
| 00 | 10100 | XX | 0 | shadow clear @ cycle 20 |
| 00 | 10110 | XX | 0 | shadow clear @ cycle 22 |
| 00 | 11000 | XX | 0 | shadow clear @ cycle 24 |
| 00 | 10010 | 00 | 1 | shadow clear @ cycle 18, |
| 01 | 10010 | 01 | 1 | equal rat |
| 10 | 10010 | 10 | 1 | |
| 11 | 10010 | 11 | 1 | |
| 00 | 10000 | 01 | 1 | shadow clear @ cycle 16, |
| 01 | 10000 | 10 | 1 | pres rat 2 faster |
| 10 | 10000 | 11 | 1 | |
| 00 | 01110 | 10 | 1 | shadow clear @ cycle 14, |
| 01 | 01110 | 11 | 1 | pres rat 4 faster |
| 00 | 01100 | 11 | 1 | shadow clear @ cycle 12, pres rat 6 faster |
| 01 | 10100 | 00 | 1 | shadow clear @ cycle 20, |
| 10 | 10100 | 01 | 1 | pres rat 2 slower |
| 11 | 10100 | 10 | 1 | |
| 10 | 10110 | 00 | 1 | shadow clear @ cycle 22, |
| 11 | 10110 | 01 | 1 | pres rat 4 slower |
| 11 | 11000 | 00 | 1 | shadow clear @ cycle 24, pres rat 6 slower | where,

RAT<1:0> = the number of cycles to be added to the refill data time.

PRES RAT<1:0> = RAT of the read that is presently being shadowed.

SHDO CNT<4:0> = the current value of the shadow counter.

NEXT RAT<1:0> = RAT time of the read waiting to be sent.

NEXT RD VLD = indicates a read is waiting to be sent when set to a "1".

The encoding of RAT <1:0> in the first column of TABLE 1 is according to TABLE 2.

TABLE 2

| |
|---|
| 00 = 0 cycles |
| 01 = 2 cycles |
| 10 = 4 cycles |
| 11 = 6 cycles |

For the purposes of explanation here, refill data with command overhead is 18 cycles.

The first four entries in TABLE 1 show the logic for each of the conditions at which the RAT is set at 0 cycles, while the shadow time increases in cycles from the first to the fourth. Also there is no read command waiting after the first few entries. Since the shadow time includes the refill data time plus the RAT, each of the encodings at the first through fourth entries are for the various shadow clear cycle times predicated on increases in the refill data time.

Starting with the fifth entry, what is shown at the fifth through the eighth entries are shadow clears of 18 cycles. Here the present RAT and the next RAT are equal. There is no offset in either direction to compensate for differences in the RAT. The ninth through the eleventh entries have a shadow that clears after 16 cycles. These represent the situations in which the present RAT is two cycles faster than the next RAT. The remaining entries, in succession, indicate cases where clearing the shadow takes 14 cycles with the present rate being 4 cycles faster, takes 12 cycles with the present rate being 6 faster, and then takes 20 cycles with the present rate being 2 slower, takes 22 cycles with the present rate being 4 cycles slower, and takes 24 with the present rate being 6 cycles slower. To obtain the time when the next command and address may be placed on the bus, the offset is applied to the refill data time. Through this scheme, memory modules with different RATs may be used without penalty. That is, without there being collisions on the bus.

The terms and expressions that are used herein are used as terms of expression and not of limitation. And there is no intention in the use of such terms and expressions of excluding the equivalents of the features shown and described, or portions thereof, it being recognized that modifications are possible in the scope of the invention.

We claim:

1. A method for controlling a shared memory bus used by at least two requesters so that the shared memory bus is full during each of a continuous string of cycle times, comprising the steps of:
   (a) placing a first command N and address on the shared memory bus for requesting data from a first responding memory connected to the shared memory bus;
   (b) waiting a first dynamically determined time period for data responding to a request at step (a) to return from the first responding memory before initiating a first additional command to the first responding memory;
   (c) placing a second command N+1 and address on the shared memory bus after a second dynamically determined time period for requesting data from a second responding memory connected to the shared memory bus, with the second dynamically determined time period being shorter than the first dynamically determined time period;
   (d) waiting a third dynamically determined time period for data responding to a request at step (c) to return from the second responding memory before initiating a second additional command to the second responding memory;
   (e) placing a third command N+2 and address on the shared memory bus after the second dynamically determined time period for requesting data from a third responding memory connected to the shared memory bus;
   (f) waiting a fourth dynamically determined time period for data responding to a request at step (e) to return from eh third responding memory;
   (g) placing a command N+P and address on the shared memory bus for requesting data after an additional responding memory returns requested data responding to a command N+R and address, with $P>2$, $R>=2$, $P>R$;
   (h) waiting a fifth dynamically determined time period for data responding to a request at step (g) to return from the additional responding memory; and
   (i) repeating steps (g) and (h) for each additional command and address.

2. The method as recited in claim 1, wherein the first dynamically determined time period is a memory latency time of the first responding memory.

3. The method as recited in claim 1, wherein the second dynamically determined time period is a snoopy shadow time.

4. The method as recited in claim 1, wherein requesting data from a memory at steps (a), (c), (e), (g), and (i) further includes a substep of requesting data from a system processor.

5. The method as recited in claim 4, wherein if a processor indicated within the second dynamically determined time period after a request was placed on the shared bus at steps (a), (c), (e), (g), and (i) that it contains data that old satisfy such request, the method further includes a step of delaying placing a next command and address on the shared bus until the processor completes returning data responding to that request.

6. The method as recited in claim 1, further comprising the step of repeating steps (a)–(d) for each additional command and address.

7. A method for controlling a shared memory bus used by at least two requesters so that the shared emory bus is full during each of a continuous string of cycle times, with a plurality of memories connected to the shared memory bus having different read access times, comprising the steps of:
   (a) storing a read access time for each memory connected to the shared memory bus;
   (b) determining a sequence for placing N commands and addresses on the shared memory bus, with $N>0$;
   (c) retrieving read access times for the memories to be accessed according to adjacent commands and addresses in the sequence;
   (d) comparing a pair of read access times for the memories to be accessed according to the adjacent commands and addresses in the sequence and determining an offset based thereon;
   (e) applying the offset to a refill data time of a memory associated with a first reqd access time of the pair of read access times compared at step (d) to determine a next command and address time;
   (f) placing a command P and address in the sequence of N commands and addresses on the shared memory bus and placing an adjacent command R and address in that sequence on the shared memory bus spaced by the next command and address time determined at step (e), with $P>0$ and $R>0$; and
   (g) repeating steps (a)–(f) for each pair of adjacent commands and addresses in the sequence of N commands and addresses.

* * * * *